April 10, 1956  R. F. MARTIN, JR., ET AL  2,741,031
MEASURING DEVICE
Filed Jan. 17, 1952  2 Sheets-Sheet 1
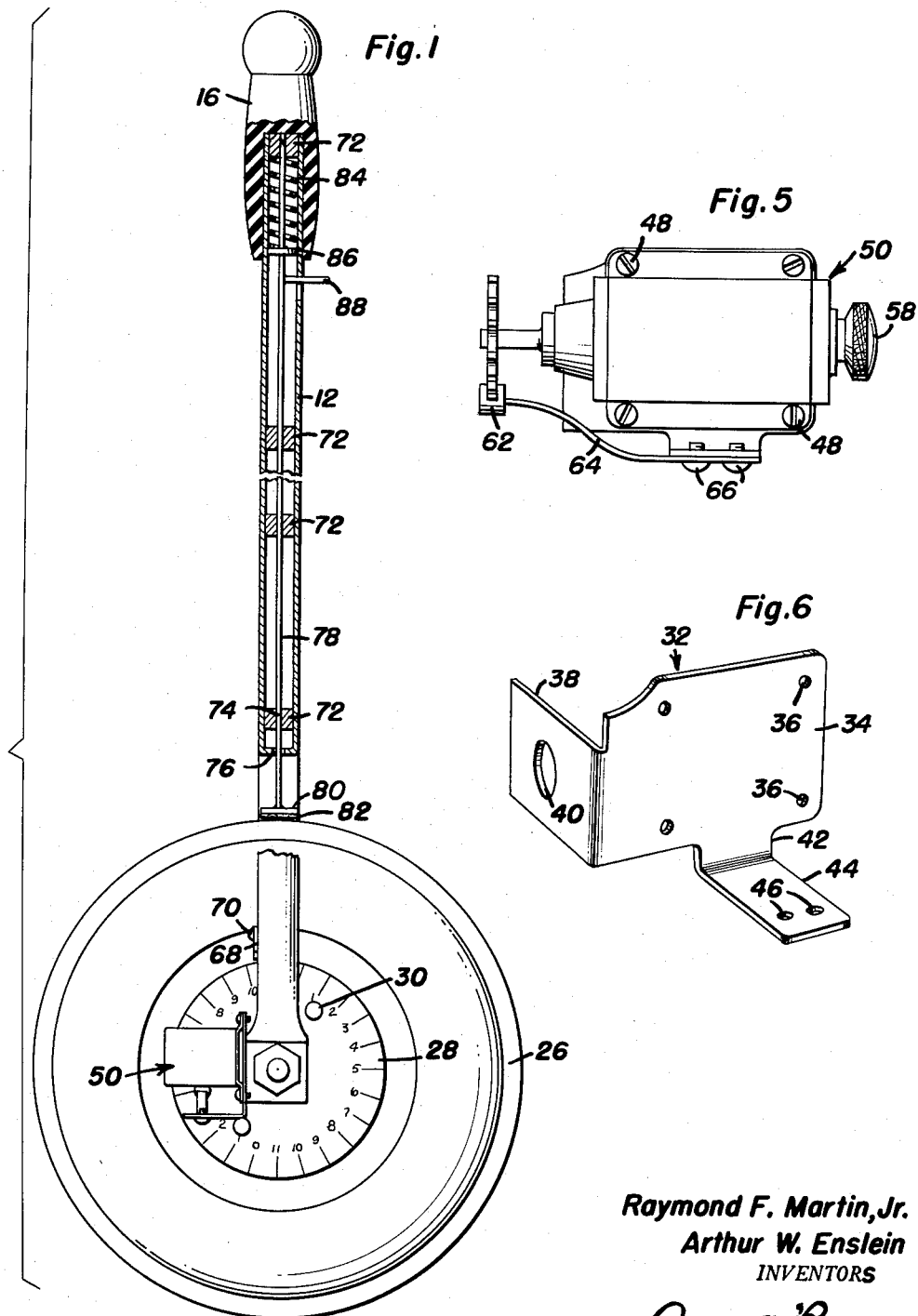
Raymond F. Martin, Jr.
Arthur W. Enslein
INVENTORS

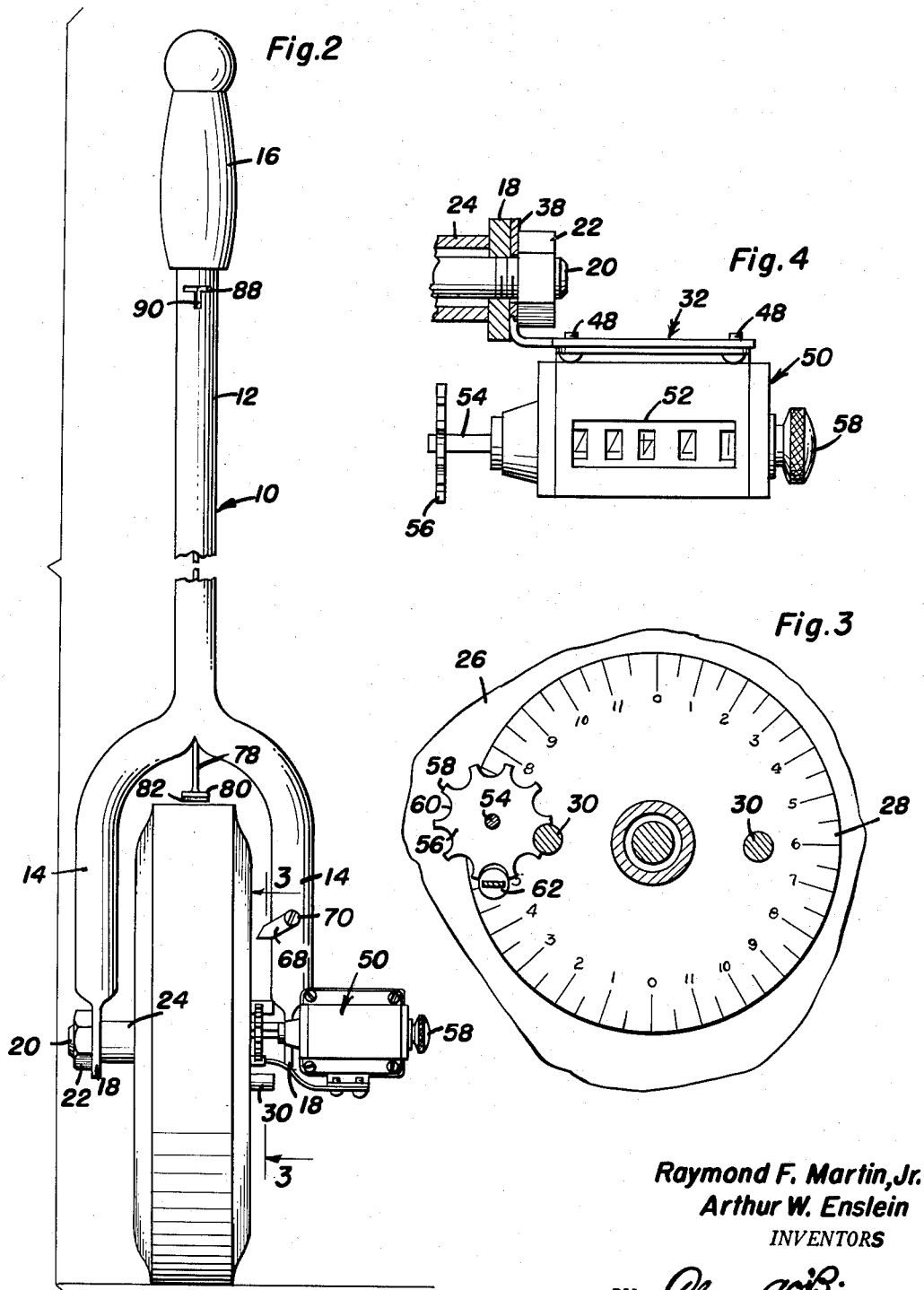

United States Patent Office 2,741,031
Patented Apr. 10, 1956

2,741,031

MEASURING DEVICE

Raymond F. Martin, Jr., and Arthur W. Enslein, Cincinnati, Ohio

Application January 17, 1952, Serial No. 266,812

1 Claim. (Cl. 33—141)

This invention relates in general to a measuring device, and more specifically to a portable measuring device for rolling along the surface to be measured.

In ascertaining many linear measurements along the ground, it has been customary to utilize tapes, either steel or fabric, which are awkward to handle, require computations, and necessitates two persons to handle same. It is readily apparent that there is a need for a measuring device which may be operated by one person and would provide an accurate tabulation of the distance measured.

The primary object of this invention is to provide an improved measuring device having a ground engaging wheel which has a circumference which is an exact multiple of a measuring unit so that the wheel may be engaged with a counter mechanism to accurately determine the distance the wheel has been rolled.

Another object of this invention is to provide an improved measuring device for measuring linear distances, said measuring device including a ground engaging wheel having a plurality of pins carried thereby, said pins being adapted to engage an arm carried by a counter mechanism whereby the number of revolutions of the wheel may be accurately recorded.

Another object of this invention is to provide an improved measuring device for accurately measuring linear distances said device being of a compact and simple construction whereby it may be economically manufactured.

Another object of this invention is to provide an improved measuring device having a counter mechanism thereon, said counter mechanism having a star wheel with a number of points equal to the fraction of a revolution indicated by the counter mechanism.

Another object of this invention is to provide an improved measuring device which includes a ground engaging wheel having pins mounted thereon, said pins being adapted to engage a star wheel of a counter mechanism whereby said star wheel is rotated a fraction of a revolution each time it is struck by one of said pins, said star wheel having a braking mechanism to limit the revolution of said star wheel upon being struck by one of said pins.

A further object of this invention is to provide an improved measuring device for measuring linear distances, said measuring device having a ground engaging wheel for measuring such distances, and a brake mechanism carried by said measuring device for locking the wheel with respect to its frame.

With these objects definitely in view, this invention resides in certain novel features of construction, combination and arrangement of elements and portions as will be hereinafter described in detail in the specification, particularly pointed out in the appended claim, and illustrated in the accompanying drawings which form a material part of this application, and in which:

Figure 1 is a side elevational view of the measuring device, which is the subject of this invention, a portion of the frame being broken away and shown in section in order to clearly show the details of a brake means carried by the handle portion of the frame, the central portion of the handle portion being omitted;

Figure 2 is a front elevational view of the measuring device of Figure 1 and showing the arrangement of the counter mechanism with respect to the frame and the wheel;

Figure 3 is an enlarged partial transverse vertical sectional view taken substantially upon the plane indicated by section line 3—3 of Figure 2 and showing the arrangement of the scale carried by the wheel, the pins carried by said scale portion of the wheel, and the relationship between the pins and a star wheel carried by said counter mechanism;

Figure 4 is an enlarged partial horizontal sectional view showing the manner in which the counter mechanism is secured to the frame of the measuring device by a special bracket;

Figure 5 is an enlarged front elevational view of the counter mechanism and showing the manner in which a brake for the star wheel of the counter mechanism is secured to the mounting bracket for the counter; and Figure 6 is an enlarged perspective view of the bracket for mounting the counter mechanism on the frame of the measuring device.

Similar characters of reference designate similar or identical elements and portions throughout the specification and throughout the different views of the drawings.

Referring now to the drawings in detail, this invention includes a frame which is referred to in general by the reference numeral 10. The frame 10 includes an elongated handle portion 12 having a bifurcated lower end in the form of parallel legs 14. The upper end of the handle portion 12 is provided with a conventional rubber handle grip 16. The leg portions 14 are provided with flattened lower ends 18 through which extends an axle bolt 20. The axle bolt 20 is provided with nuts 22 engaging the outer surfaces of the flattened end portions 18 to retain the axle bolt 20 therein. Mounted on the axle bolt 20 is a hub 24 of a wheel 26. It is preferred that the wheel 26 is a rubber tired wheel, and that the circumference of the wheel is exactly twenty-four inches.

Referring now to Figures 1 and 3 in particular, it will be seen that the wheel 26 is provided on one side thereof with a metal plate in the form of a scale 28. The scale 28 is provided with twenty-four main divisions, said divisions being marked from zero through eleven so as to indicate each inch the wheel 26 has rotated. The scale 28 may also be provided with auxiliary markings between each main marking so as to indicate fractions of an inch the wheel 26 has rotated. The scale 28 is provided with a pair of diametrically opposite pins 30 which are adjacent the main indication marks indicated by the numeral 6. The purpose of the pins 30 will be explained in more detail hereinafter.

Referring now to Figure 6 in particular, it will be seen that there is illustrated a bracket which will be referred to in general by the reference numeral 32. The bracket 32 includes a main mounting plate portion 34 having rectilinear spaced apertures 36 therethrough. Carried by one edge of the plate 34 and extending rearwardly thereof at right angles thereto is an attaching flange 38 having a central enlarged opening 40 therein. Extending downwardly from the lower edge of the plate 34 is a flange portion 42 to which is integrally connected an outwardly and forwardly directed auxiliary mounting flange 44. The mounting flange 44 is provided with a pair of spaced apertures 46 adjacent its free end.

Referring now to Figures 4 and 5 particularly, it will be seen that the bracket 32 is secured to the frame 10 by inserting the mounting flange 38 over one end of the axle bolt 20 with the axle bolt passing through the enlarged opening 40. The mounting flange 38 is clamped against the flattened end 18 of one of the legs 14 by one of the nuts 22 threadedly engaged on one end of the axle bolt 20. Secured to the mounting plate portion 34 of the bracket 32 by screws 48 passing through the apertures 36 and threadedly engaged therein is a counter mechanism 50.

The counter mechanism 50 is provided with an opening 52 in the upper wall thereof through which the total number of revolutions of a shaft 54 carried by the counter mechanism may be read. Carried at the end of the shaft 54 away from the counter mechanism 50 is a star wheel 56. The counter mechanism is also provided with a knurled knob on the end opposite from the shaft 54, said knob being referred to by the reference numeral 58 and for the purpose of setting the counter back to zero.

Referring now to Figures 3 and 5 in particular, it will be seen that the star wheel 56 is provided with ten points 58 which have ten semi-circular recesses 60 therebetween. The counter mechanism 50 records each one-tenth of a revolution of the shaft 54 so that each time one of the points 58 move to the position previously maintained by a next adjacent point, the counter increases by one number. It will be noted that the diameter of the semi-circular portion 60 is substantially equal to the diameter of each of the pins 30. As is clearly shown in Figure 3, as each pin 30 comes into engagement with one of the points 58 it is seated within a groove 60 and rotates the star wheel 65 one-tenth of a revolution.

In order that the star wheel 56 does not continue to rotate after being struck by one of the pins 30, it is provided with a brake which includes a headed portion 62 of substantially the same diameter of the pins 30. The headed portion 62 is mounted on the end of a spring arm 64 which is secured to the auxiliary securing flange 44 by a plurality of screws 66 threadedly engaged within the apertures 46 of the securing flange 44.

In view of the foregoing, it will be seen that each time the wheel 26 makes a half revolution due to its rolling over one foot of ground, the star wheel 56 is rotated one-tenth of a revolution and the reading on the counter is increased by one. In this way the counter records the number of feet which the wheel 26 has travelled. Secured to one of the legs 14 adjacent the scale 28 is a pointer 68 which is secured to the leg 14 by a screw 70. By utilizing the pointer 68, the distance travelled by the wheel 26 may be determined to a nearest fraction of an inch, for example, one-half inch.

Referring now to Figure 1 in particular, it will be seen that mounted within the handle portion 12 of the frame 10 is a brake for engaging the wheel 26 and locking same against rotation with respect to the frame 10. The handle portion 12 is tubular and is provided with a plurality of spaced guide members 72 secured therein. The guide members 72 have central bores 74 in alignment with an opening 76 in the bottom of the handle portion 12. Slidably mounted in the bores 74 and extending through the opening 76 is a brake rod 78. The brake rod 78 is provided with an enlarged lower end in the form of a plate 80 secured thereto. The plate 80 is provided on its lower surface with a friction coating 82 for engaging the rubber tire portion of the wheel 26. The plate 80 is urged against the wheel 26 by a spring 84 mounted within the handle portion 12 and bearing against a washer 86 mounted on the brake rod 78 adjacent its upper end. The upper end of the spring 84 is compressibly engaged against the bottom surface of an upper guide member 72 secured to the uppermost end of the handle portion 12. In order that the brake rod 78 may be locked in an inoperative position where the coating 82 is out of engagement with the wheel 26, the brake rod 78 is provided with an angularly extending arm 88. As is best illustrated in Figure 2, the handle portion 12 is provided with a T-shaped slot 90 adjacent its upper end through which the arm 88 extends. When the arm 88 is disposed within one of the arms of the T-shaped slot 90 the brake is in an inoperative position. In order to actuate the brake, it is only necessary to move the arm 88 down into the leg portion of the T-shaped slot 90.

The operation of this measuring device will be understood from the foregoing description of the mechanical details thereof, taken in connection with the above recited objects and the drawings. Further description would appear to be unnecessary.

Minor modifications of the measuring device, varying in minor details from the embodiment of the device illustrated and described here, may be resorted to without departure from the spirit and scope of this invention, as defined in the appended claim.

Having described the invention, what is claimed as new is:

A portable measuring device for measuring linear distances along the ground, said measuring device comprising an elongated handle having a bifurcated lower end including a pair of spaced legs, an axle extending between said legs, a wheel carried by said axle for rotation, said wheel having a circumference which is an exact multiple of a measuring unit, an indicating disc carried by said wheel, a pointer carried by one of said legs and associated with said indicating disc, means for recording the number of units of measurement travelled by said wheel, brake means for resisting rotation of said wheel, said recording means including a counter clamped to said one leg by axle retaining means, said counter having a star wheel engageable with pins carried by said indicating disc, a spring urged pin carried by said counter engaging said star wheel and resisting rotation thereof, said brake means including an elongated rod extending through said handle and slidably mounted therein, a lower end portion of said rod projecting downwardly into a space between said legs and having an element on the lower end thereof for engaging the periphery of said wheel, said rod being spring urged downwardly, and lock means for retaining said rod in an inoperative position.

References Cited in the file of this patent

UNITED STATES PATENTS

| | | |
|---|---|---|
| 238,563 | Brown | Mar. 8, 1881 |
| 530,686 | Gray | Dec. 11, 1894 |
| 591,761 | Hart | Oct. 12, 1897 |
| 700,286 | Arthur | May 20, 1902 |
| 874,994 | Richardson | Dec. 31, 1907 |
| 1,065,367 | Ingram | June 24, 1913 |
| 2,123,360 | Harris | July 12, 1938 |

FOREIGN PATENTS

| | | |
|---|---|---|
| 15,039 | Switzerland | Aug. 6, 1897 |
| 384,791 | Great Britain | Dec. 15, 1932 |